(12) United States Patent
Hashiguchi

(10) Patent No.: US 8,930,661 B2
(45) Date of Patent: Jan. 6, 2015

(54) OPERATION PROCESSING DEVICE AND METHOD OF DETECTING MEMORY LEAK

(75) Inventor: Masafumi Hashiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 13/046,969

(22) Filed: Mar. 14, 2011

(65) Prior Publication Data

US 2011/0238940 A1    Sep. 29, 2011

(30) Foreign Application Priority Data

Mar. 25, 2010  (JP) .................................. 2010-71056

(51) Int. Cl.
*G06F 12/02* (2006.01)
*G06F 17/30* (2006.01)
*G06F 11/07* (2006.01)

(52) U.S. Cl.
CPC ........ *G06F 12/0253* (2013.01); *G06F 12/0261* (2013.01); *G06F 11/073* (2013.01); *G06F 11/076* (2013.01)
USPC ............................ 711/165; 711/170; 707/814

(58) Field of Classification Search
None
See application file for complete search history.

(56) References Cited

U.S. PATENT DOCUMENTS

| | | | |
|---|---|---|---|
| 7,765,375 B2 | 7/2010 | Yamada et al. | |
| 7,979,659 B2* | 7/2011 | Obata et al. | 711/165 |
| 2005/0081190 A1* | 4/2005 | Betancourt et al. | 717/124 |
| 2009/0083509 A1* | 3/2009 | Johnson | 711/170 |
| 2010/0161687 A1* | 6/2010 | Altrichter et al. | 707/813 |
| 2013/0067185 A1* | 3/2013 | Obata et al. | 711/165 |

FOREIGN PATENT DOCUMENTS

JP    2009-026081 A    2/2009

* cited by examiner

*Primary Examiner* — Kaushikkumar Patel
(74) *Attorney, Agent, or Firm* — Fujitsu Patent Center

(57) ABSTRACT

A memory leak detecting method includes: producing an object which occupies an area on a first area of the memory; checking a presence of a pointer which points at the object separately so as to remove the object and to repeatedly carry out a process for increasing a counter value of the object; moving the object from the area on the first area of the memory to an area on the second area of the memory when the counter value exceeding a first threshold; and moving the object from the area on the second area to the area on the first area and clearing the counter value of the object upon the object occupying the area on the second area.

5 Claims, 17 Drawing Sheets

FIG. 15

INSTANCE OF "TEST" HAS EXPERIENCED MORE THAN 1000 GCS WITH NO ACCESS.
ALLOCATED :
    AT TEST . METHOD4 (TEST . JAVA : 21)
    AT TEST . METHOD3 (TEST . JAVA : 16)
    AT TEST . METHOD2 (TEST . JAVA : 12)
    AT TEST . METHOD1 (TEST . JAVA : 8)
    AT TEST . MAIN (TEST . JAVA : 4)

US 8,930,661 B2

OPERATION PROCESSING DEVICE AND METHOD OF DETECTING MEMORY LEAK

CROSS-REFERENCE TO RELATED APPLICATIONS

This application is based upon and claims the benefit of priority of the prior Japanese Patent Application No. 2010-071056, filed on Mar. 25, 2010, the entire contents of which are incorporated herein by reference.

FIELD

The application relates to an operation processing device and a method of detecting a memory leak.

BACKGROUND

After an object which occupies an area to be accessed on a memory is produced and used, the object having been made unnecessary is erased as a general rule. An object once produced, however, can possibly remain without being erased to cause a memory leak for a reason that, e.g., a program writer has made an error in the control of allocating or releasing an area on the memory. If such a memory leak occurs, a usable memory area is limited. If memory leaks increase, the memory can possibly be exhausted possibly resulting in a problem of a system failure, etc.

In a system in which a garbage collection function (GC) is implemented such as the Java (registered trademark) language, an object and a pointer pointing at the object are not managed by the program writer but are managed by the GC. Thus, even if the program writer makes an error in the control of allocating or releasing an area on the memory, that kind of memory leak can be prevented. If no pointer points at the object, the GC identifies the object as garbage and a target to be erased.

In other words, the GC does not identify the object as a target to be erased while the pointer pointing at the object exists. Thus, under conditions in which the object and the pointer pointing at the object exist but nevertheless the object is never used again, the unnecessary object continues to remain in the memory. If such objects increase, the memory ends up being exhausted. That is a memory leak that occurs even to a system in which the GC is implemented.

While a program writer can use a lot of application programming interfaces (API) at present as open usage of software has become widespread, he or she finds it difficult to understand in detail the inside of an API that he or she will use. Thus, an error in a method for using the API can possibly cause a memory leak of a type such that a pointer of an unnecessary object exists and the unnecessary object resultantly continues to remain.

Some methods for detecting a memory leak, e.g., of the Java (registered trademark) language are known, such as Oracle JRockit Mission Control (Memory Leak Detector) or IBM HeapAnalyzer.

The method of Oracle JRockit Mission Control (Memory Leak Detector) is, if instances of one and the same class increase a lot in a time unit, for notifying a user of a name of the class and objects as a candidate of a memory leak.

Meanwhile, the method of IBM HeapAnalyzer is, if lots of instances of one and the same class remain on a memory at the end of the GC, provides a user with a name of the class and object information as a candidate of a memory leak.

These methods for detecting a memory leak have following problems in:

that the methods are unable to detect a small memory leak, e.g., just one leaking object;

that the methods are unable to detect a memory leak that occurred in the past. In case of an application that periodically repeats a memory leak, no leak can be detected even if a tool is used when no memory leak occurs; and that lots of objects which remain on the memory do not necessarily cause a leak. An object programmed to be used at a certain time after being unused for a while can possibly exist. Thus, in order to identify whether a memory leak is present, it is necessary to observe information of the object for a certain period of time.

Further, a method for recording entire information of access to all objects on every page of a memory so as to detect a memory leak at a frequency of the access is known, e.g., as disclosed in Japanese Unexamined Patent Application Publication No. 2009-26081. Observation of the entire access to all the objects, however, excessively loads the system operation. Further, if objects of different access frequencies are arranged on a same page, the method for recording the access on every page reduces accuracy of the leak detection.

SUMMARY

According to an aspect of the embodiment, a method of detecting a memory leak includes:

producing an object which occupies an area on a first area of the memory;

checking a presence of a pointer which points at the object separately so as to remove the object and to repeatedly carry out a process for increasing a counter value of the object;

moving the object from the area on the first area of the memory to an area on the second area of the memory when the counter value exceeds a first threshold;

moving the object from the area on the second area to the area on the first area and clearing the counter value of the object when the object occupies the area on the second area; and outputting the object occupying the area on the second area when the counter value exceeds a second threshold.

The object and advantages of the embodiment will be realized and attained at least by the elements, features, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 15 illustrates exemplary data of an object output at a operation S443 in FIG. 14 and possibly causing a memory leak;

DESCRIPTION OF EMBODIMENTS

According to a method of detecting a memory leak disclosed here by the application, the processor carries out the following (1)-(5) processes:

(1) to produce an object that occupies an area on a first area of the memory;

(2) to repeat a following process. In the process, every object is examined for existence of a pointer that points at the object and an object with no pointer is removed. Further, in the process as well, a counter value of every object with a pointer is individually counted;

(3) to move an object for which the counted value exceeds a first threshold from the area on the first area of the memory to an area on a second area of the memory;

(4) to move, an object occupying an area on the second area, to an area on the first area, and to clear the counter value of the object; and (5) to output one of objects which occupy areas on the second area, for which the counter value exceeds a second threshold.

Incidentally, the memory to be dealt with by the method of detecting a memory leak disclosed by the application is a memory to be a target in which an object occupies an area, and is not limited to a main memory. If, e.g., the object counts as an area in a storage portion of an HDD (hard disk drive) as a target to be occupied, the storage portion of the HDD is included in the memory of the application.

An embodiment of the application will be explained below.

Figure 1:
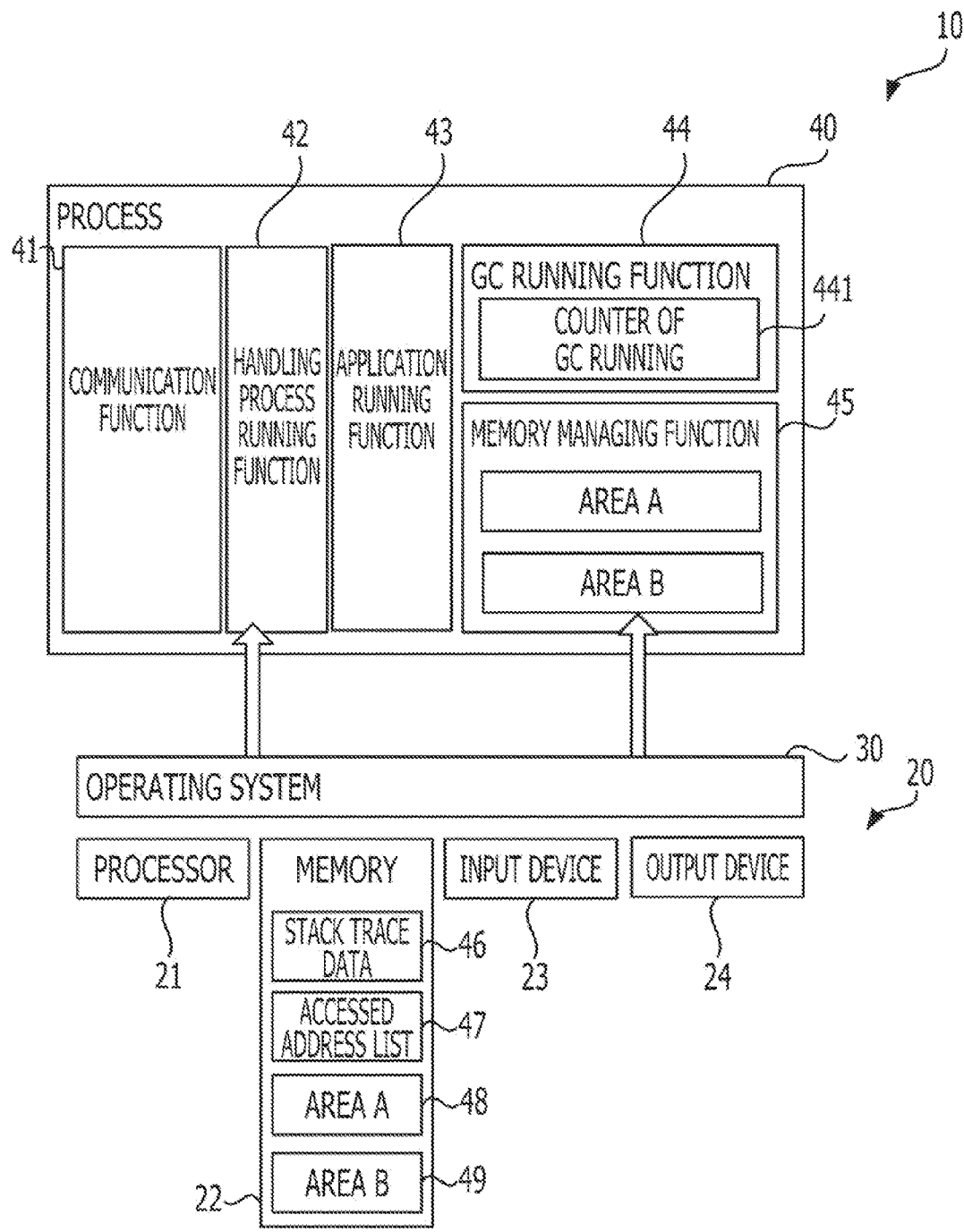
FIG. 1 illustrates a configuration of an operation processing device.

FIG. 1 illustrates a configuration of an operation processing device of an embodiment.

A hardware configuration is illustrated in a lowest portion of FIG. 1, where a personal computer (PC) of an ordinary configuration is assumed. A processor 21, a memory 22, an input device 23 and an output device 24 are included as hardware 20. The processor 21 runs a program. The memory 22 is in charge of data storage, and is accessed (data writing or reading) upon the program being run. The memory 22 of the embodiment is a main memory in which the program to be run by the processor 21 is stored. The memory of the application, however, need not be limited to a main memory, and can be a storage device such as an HDD (hard disk drive).

Further, the input device 23 includes an input device which accepts a user's operation through a keyboard, a mouse, etc., and a receiving device, etc., which accepts instructions from the outside of the operation processing device 10 through a communication line, etc.

Further, the output device 24 includes an image display device which displays an image for a user of the operation processing device 10, a speaker which delivers sound to the user, and a transmitting device, etc., which sends information to the outside of the operation processing device 10 through a communication line, etc.

An operating system (OS) 30 runs on the hardware 20, and a process 40 is run as software as controlled by the OS. The OS 30 is in charge of the process 40. Controls of the embodiment to be focused on as to the embodiment are "to call a handling process" and "to change access protection", which will be described later in detail.

The process 40 has a communication function 41, a handling process running function 42, an application running function 43, a GC running function 44 and a memory managing function 45. Further, the process 40 manages stack trace data 46 on the memory 22 and an accessed address list 47.

The operation processing device 10 has various kinds of application programs as well as the hardware 20, the OS 30 and the process 40 described here.

The communication function 41 which forms the process 40 is a thread in charge of communication between the process 40 and another process or the input device 23.

The handling process running function 42 is in charge of running a handling process when an area B being prohibited from being accessed is illegally accessed, which will be described later in detail.

The application running function 43 is a thread to be activated when various applications are run.

The GC running function 44 repeatedly runs the GC. The GC running function 44 has a counter of GC running 441. The counter 441 counts the number of times of GC running for every object, which will be described later in detail.

The memory managing function 45 sets areas A and B on the memory 22 on the hardware 20 and manages the areas A and B. How to use the areas A and B will be described later. The stack trace data 46 and the accessed address list 47 will be described later as well.

Figure 2:
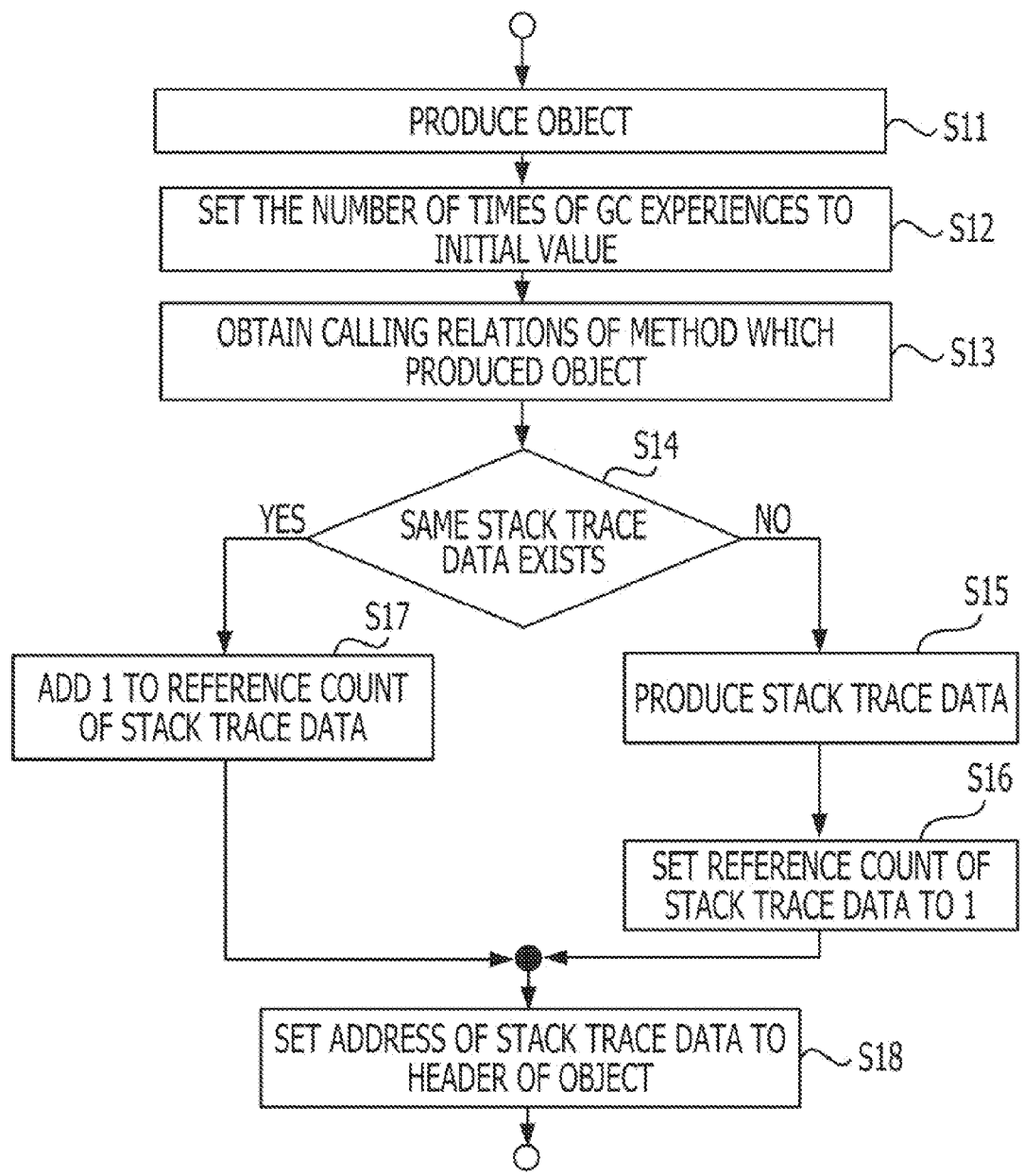
FIG. 2 is a flowchart illustrating a procedure to produce an object.

FIG. 2 is a flowchart illustrating a procedure to produce an object.

If an application program is run and the application program instructs that an object be produced, the application running function 43 carries out a process according to the flowchart illustrated in FIG. 2.

Figure 3:
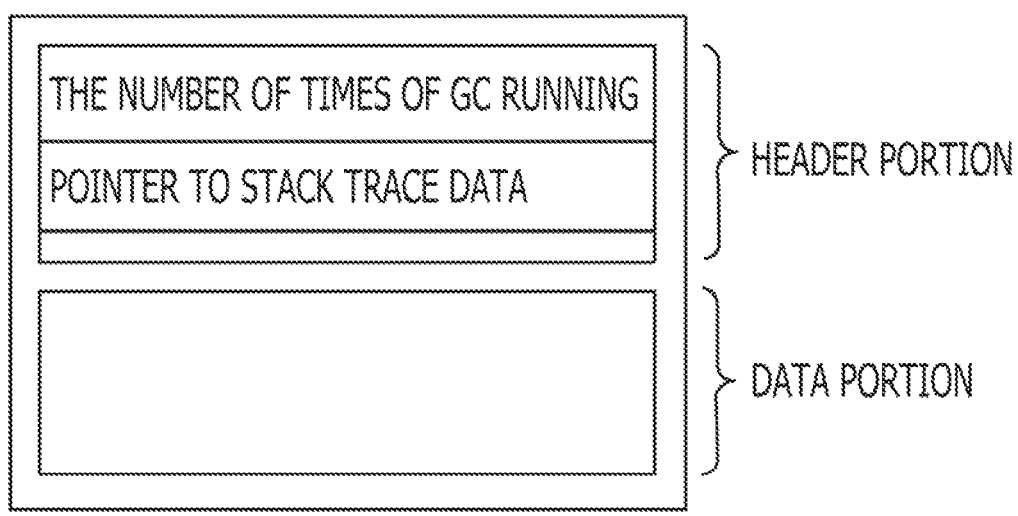
FIG. 3 illustrates an object structure.

FIG. 3 illustrates an object structure.

The object has a data portion to or from which data is written or read and a header portion in which the number of times of GC running and a pointer to the stack trace data are recorded.

Figure 4:
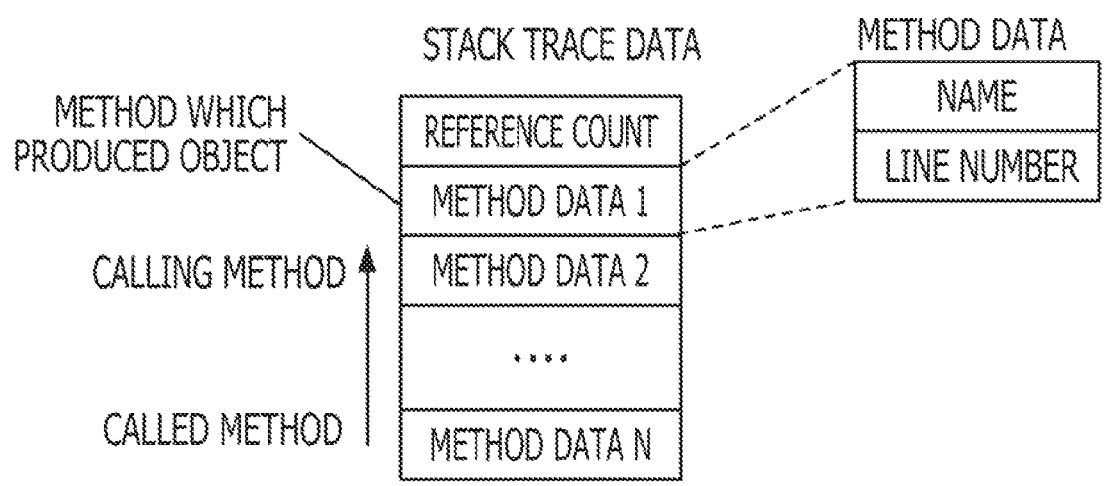
FIG. 4 schematically illustrates a structure of stack trace data.

FIG. 4 schematically illustrates a structure of the stack trace data.

Method data representing methods is stacked here in order of a calling method to a called method. Each of the method data is formed by a name of a method and a numerical value (line number) that specifies a line on which the method is written in the program. A method is specified by the name and the line number recorded there.

Method data 1, 2, ..., N is stacked here, and the method data 1 stacked on the top is the method that has produced the object. The stack trace data further has a "reference count". The "reference count" is a counter provided for a case in which objects produced multiple times have the same stack trace data, so as to avoid a plurality of the same stack trace data from being made. A positive number n recorded on the "reference count" represents that that one piece of stack trace data is common to n-objects.

Figure 5:
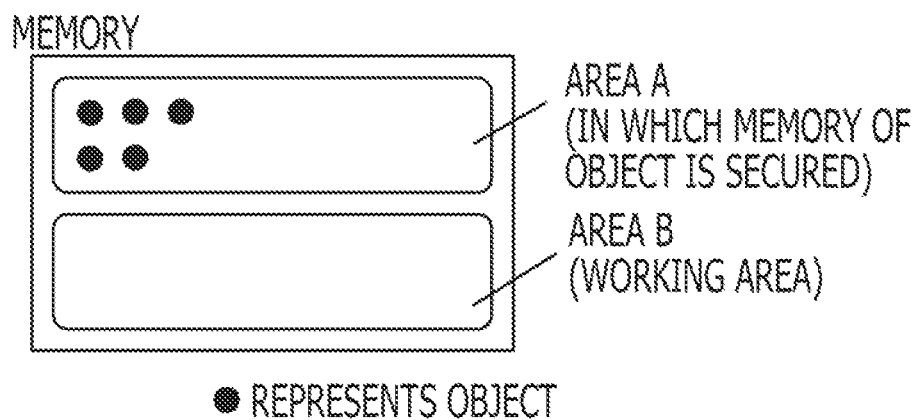
FIG. 5 schematically illustrates areas A and B on a memory.

FIG. 5 schematically illustrates the areas A and B on the memory.

An object is produced so as to occupy a part of the area A. The area B is not used when an area is produced. An object once produced can possibly be moved, though, in such a way that the object occupies an area in the area B, which will be explained later.

The flowchart illustrated in FIG. 2 will be explained on the basis of the explanation with reference to FIGS. 3-5.

An object is produced (operation S11). In order that the object is produced, as described above, an area in the area A is allotted to the object as an area to and from which data is written and read. The object has the header portion illustrated in FIG. 3, and the number of times of GC running set in the header portion is set to an initial value (zero in this case) (operation S12).

The calling relations (see FIG. 4) of the method which produced the object are obtained (operation S13), and whether stack trace data which is substantially the same as the stack trace data to be referred to by the object produced exists is identified (operation S14). If no such stack trace data exists, produce stack trace data for the object produced (operation S15), set the reference count of the stack trace data to '1' (operation S16), and set the address of the stack trace data is set to the header of the object produced (operation S18).

If substantially the same stack trace data which already exists is identified at the operation S14, add '1' to the reference count of the same stack trace data (operation S17), and set the address of the same stack trace data to the header of the object (operation S18).

Figure 6:
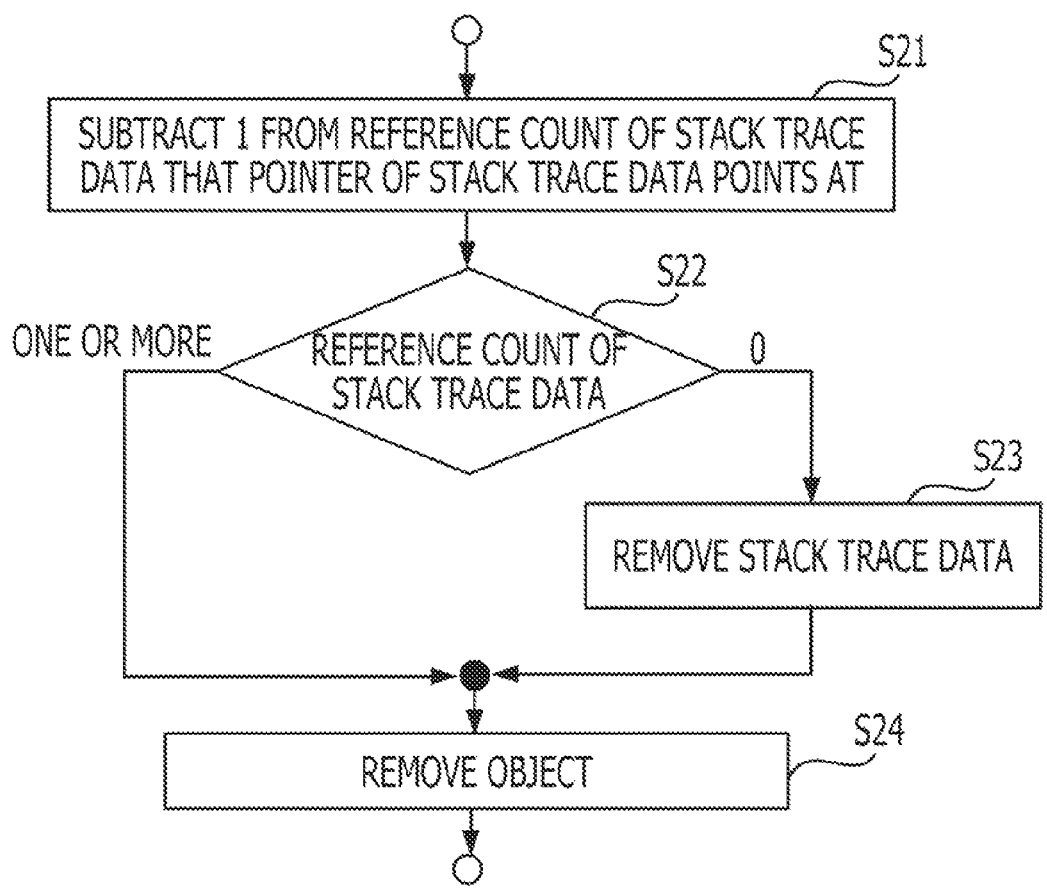
FIG. 6 is a flowchart illustrating a procedure to remove an object.

FIG. 6 is a flowchart illustrating a procedure to remove an object.

FIG. 6 is a flowchart of a case in which the GC removes the object. That is, if no pointer that points at the object remains, the GC running function 44 (see FIG. 1) carries out a process according to the flowchart in FIG. 6.

In this case, '1' is subtracted from the reference count (see FIG. 4) of the stack trace data that the pointer of the stack trace data recorded in the header of the object to be removed as determined points at (operation S21). Identification of whether the reference count is zero or one or more after '1' is subtracted (operation S22). If the reference count is zero, the stack trace data (operation S23) is removed, and the object itself to be removed as instructed (operation S24) is also removed. If the reference count of the stack trace data being one or more is identified at the operation S22, the object to be removed as instructed while leaving the stack trace data (operation S24) is removed.

Figure 7:
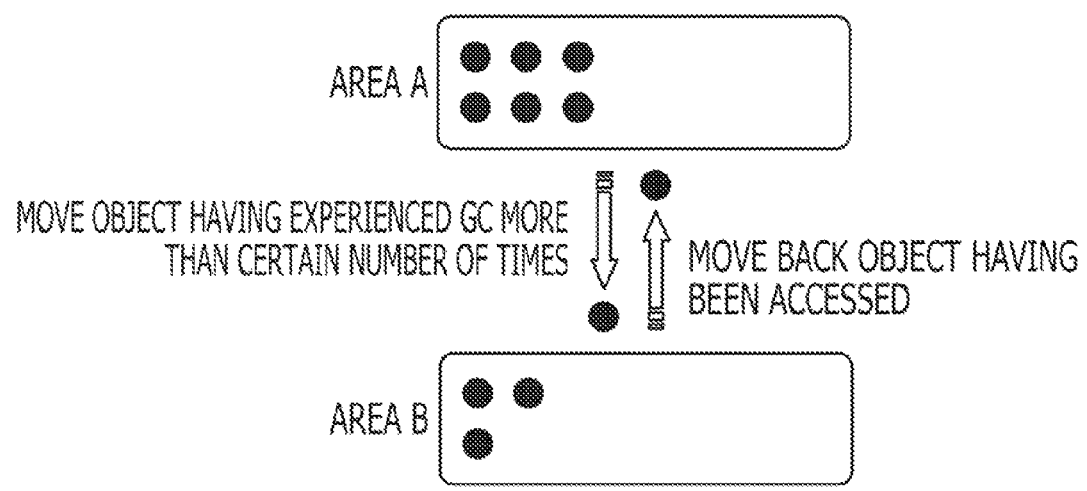
FIG. 7 schematically illustrates a move of an object.

FIG. 7 schematically illustrates a move of an object.

In order that an object is produced, as described above, an object is set in the area A. Here, it is called that the object is put in the area A. An object having experienced the GC more than a certain number of times owing to GC repetition described later is changed in such a way that the occupied area is in the area B. Here, it is called that the object is moved to the area B.

If the object moved to the area B is accessed, the object is moved back to the area A.

Figure 8:
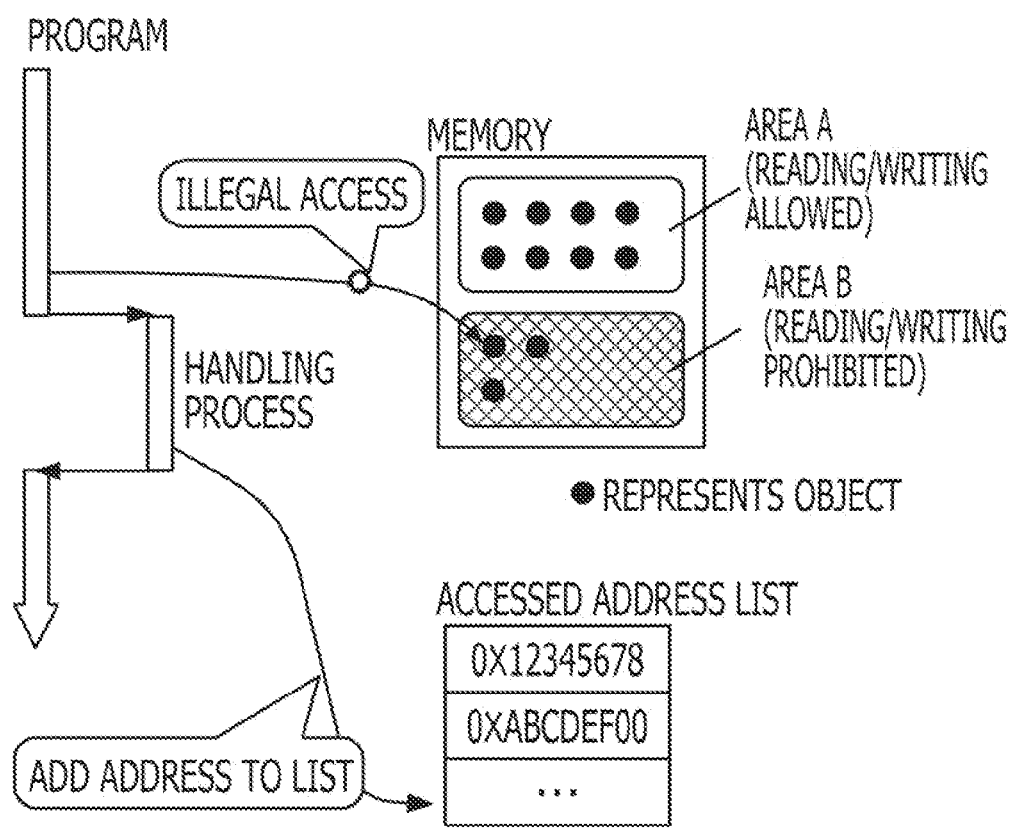
FIG. 8 illustrates a process for running an object being in the area B.

FIG. 8 illustrates a process for running the object which is in the area B.

Examples of a method employed here of detecting an access to the object is to use an OS-provided function for changing memory access protection. The OS-provided function for changing memory access protection is mprotect of Solaris or Linux, or VirtualProtect of Windows (registered trademark), etc.

Both reading and writing operations for access protection in the area B are prohibited. Further, a process for handling an illegal access is set.

If an object being in the area B is accessed in the above conditions, the OS detects an illegal access and the handling process having been set is run. According to the handling process, the access protection in the area B is changed to what allows both reading and writing operations, and the access to the object is done. Further, the accessed address is added to the list. The access protection in the area B returns to what prohibits both reading and writing operations. After the handling process ends here, the process returns to the former process.

In a next GC, an object including the address included in the list is moved to the area A and the number of times of GC running of the object is changed to the initial value.

The process for running an object being in the area B will be explained in accordance with a flowchart.

Figure 9:
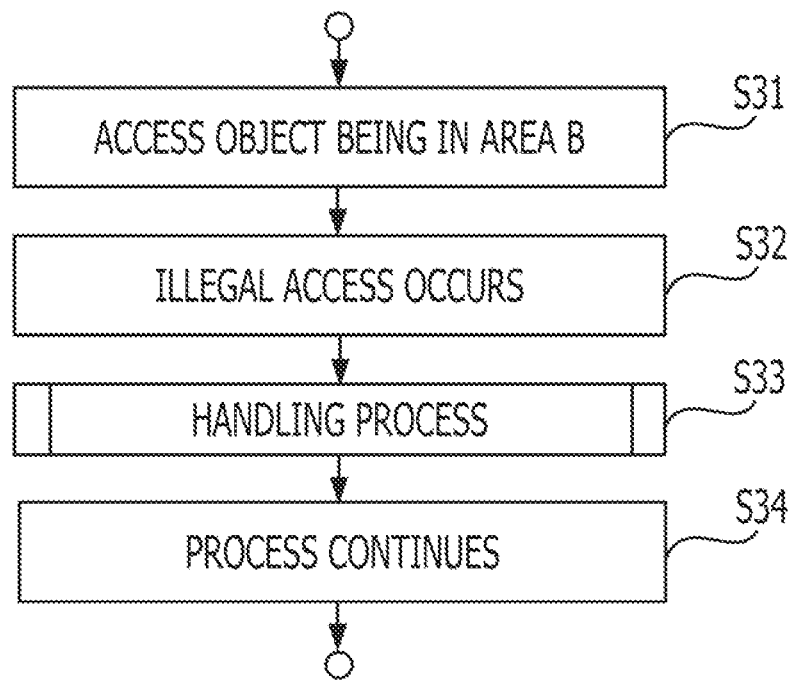
FIG. 9 is a flowchart illustrating a process to be run upon an application program accessing an object being in the area B.

FIG. 9 is a flowchart illustrating a process to be run upon an application program accessing an object being in the area B.

If an application program accesses an object being in the area B (operation S31), an illegal access occurs (operation S32) and a handling process is carried out (operation S33). After the handling process ends, the process according to the application program continues (operation S34).

Figure 10:
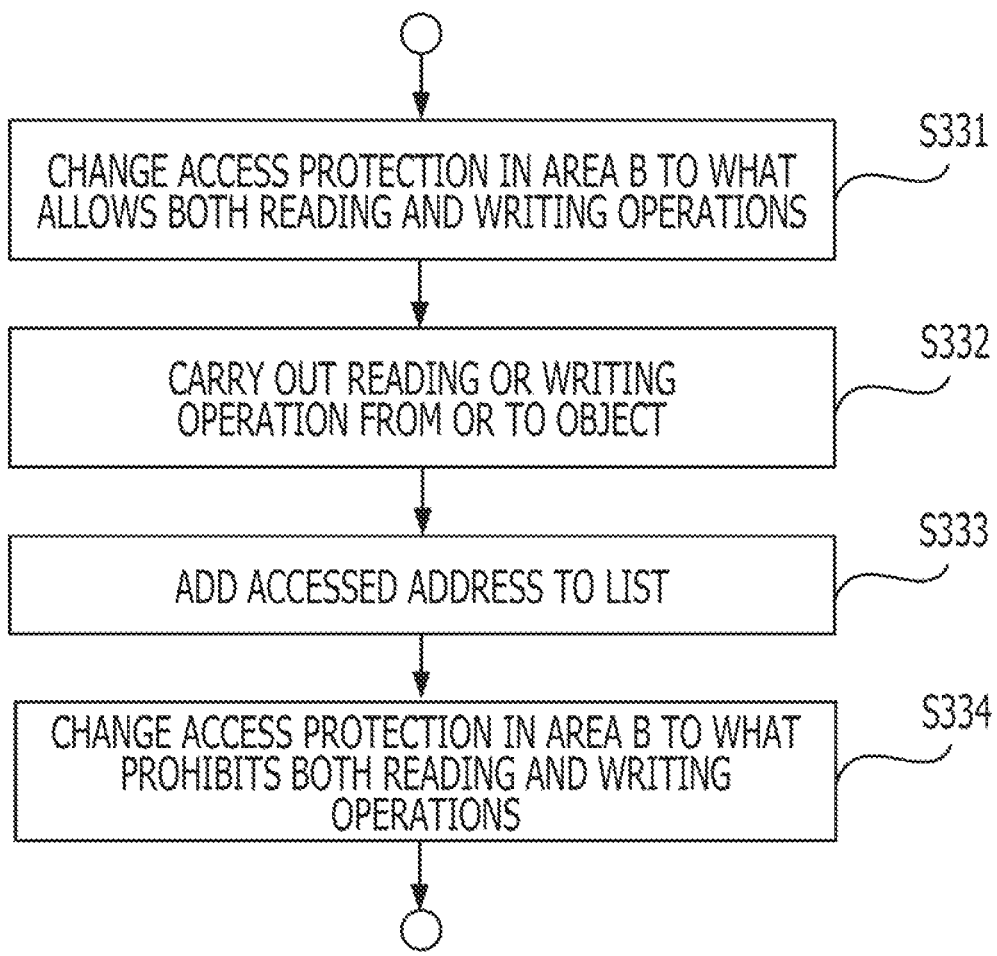
FIG. 10 is a flowchart illustrating a handling process.

FIG. 10 is a flowchart illustrating the handling process.

According to the handling process at the operation S33 in FIG. 9, the access protection in the area B is changed to what allows both reading and writing operations (operation S331), and a reading or writing operation from or to the object is carried out (operation S332). Further, the address in the area B accessed this time is added to the list (see FIG. 8) (operation S333), and the access protection in the area B is changed back to what prohibits both reading and writing operations (operation S334).

According to the embodiment, the object is not moved from the area B to the area A at this point of time in the handling process, but is moved when a next GC process is carried out.

Figure 11:
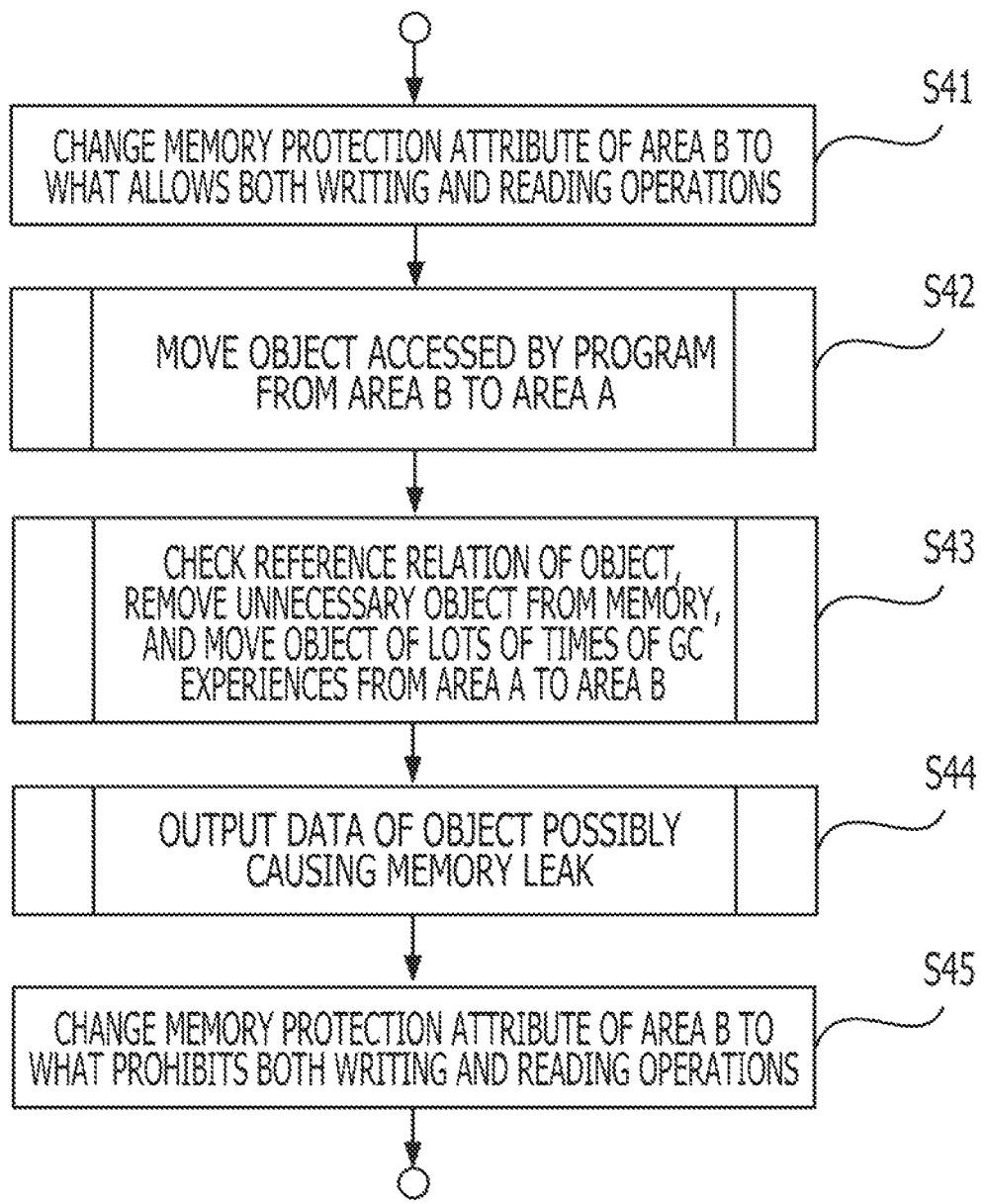
FIG. 11 is a flowchart illustrating a main routine of a GC process.

FIG. 11 is a flowchart illustrating a main routine of the GC process.

The GC running function 44 illustrated in FIG. 1 carries out the GC process explained below. The GC process can be carried out at regular intervals, or can be randomly carried out, e.g., at a timing of a bit dropped rate of operation of the processor 21 (see FIG. 1).

According to the GC process illustrated in FIG. 11, at first, the access to the area B having been prohibited is released (operation S41). That is, the memory protection attribute of the area B is changed to what allows both writing and reading operations.

The process for moving the object from the area B to the area A is carried out (operation S42). That is, the list (see FIG. 8) in which addresses accessed in the area B are recorded is here referred to, and an object including one of the addresses recorded in the list is moved from the area B to the area A.

Further, an unnecessary object is removed, and a process for moving the object with a lot of number of GC running in the area A is moved to the area B (operation S43). Further, a process for outputting data of an object being in the area B possibly causing a memory leak is carried out (operation S44). The access to the area B is prohibited again (operation S45).

Figure 12:
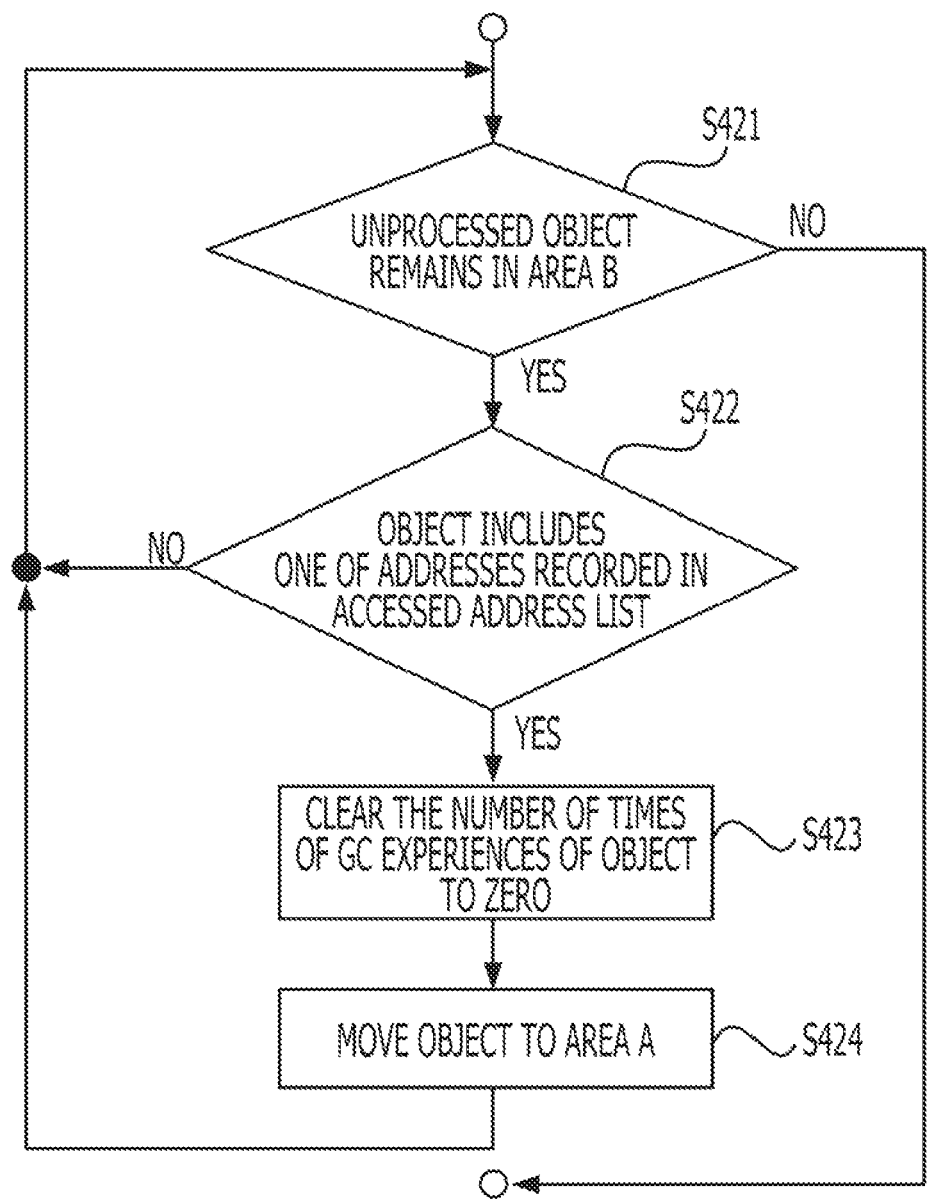
FIG. 12 is a flowchart illustrating a process for moving an object from the area B to the area A at a operation S42 in FIG. 11.

FIG. 12 is a flowchart illustrating the process for moving the object from the area B to the area A at the operation S42 in FIG. 11.

In FIG. 12, while the objects being in the area B are each focused on one by one, a following process is carried out for the focused-on object (operation S421).

An identification is made whether the focused-on object includes one of the addresses recorded in the list (see FIG. 8) of the accessed addresses (operation S422). If the focused-on object has no relation to the addresses in the list, the process returns to operation S421 and focus on the next object.

Meanwhile, if the focused-on object includes one of the addresses in the list (operation S422), the number of times of GC running to zero (operation S423) is cleared and the focused-on object from the area B to the area A (operation S424) is moved. The process returns to the operation S421 and focus on the next object.

If the process is completed for all the objects being in the area B, the routine is exited (operation S421).

Figure 13:
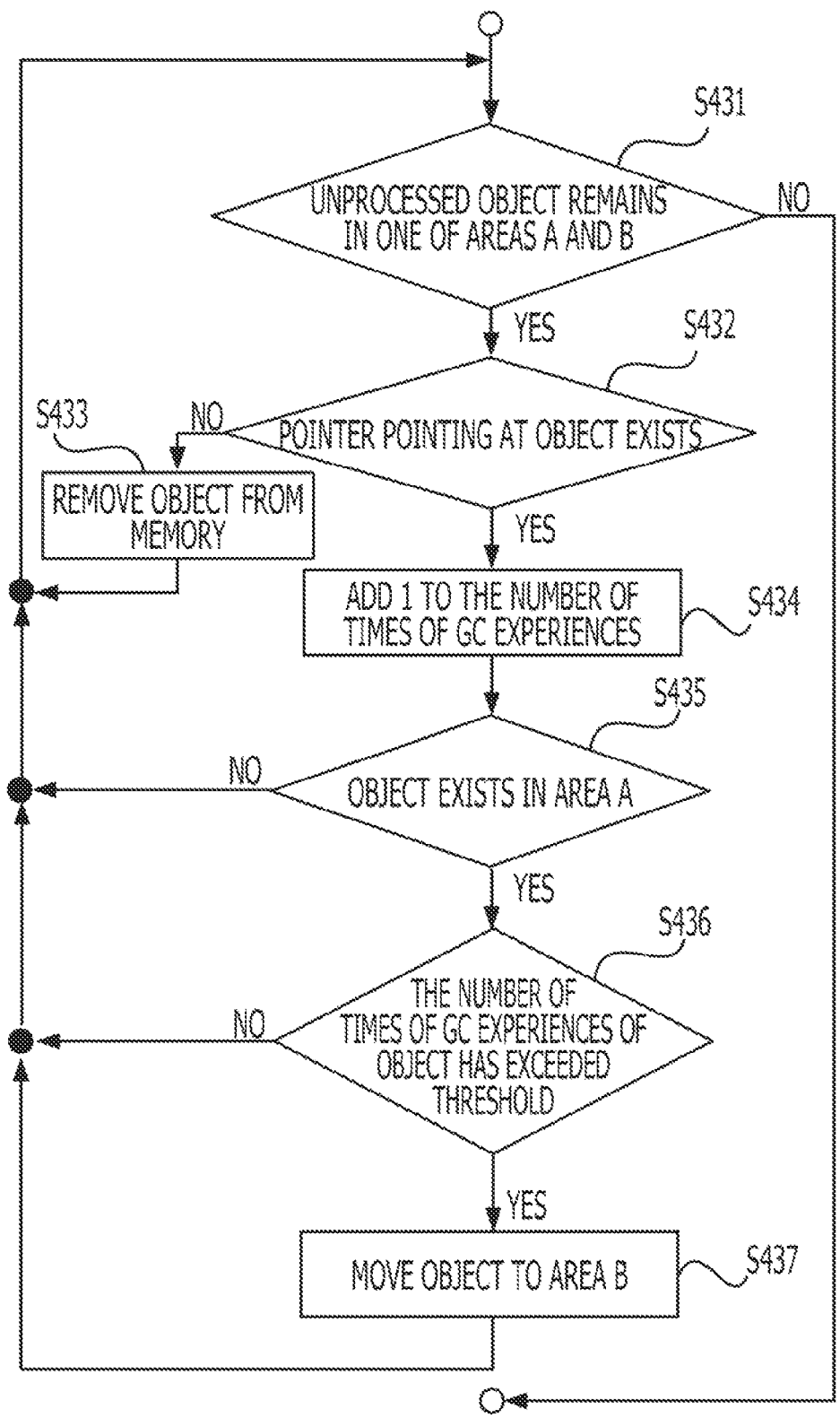
FIG. 13 is a flowchart illustrating a process for removing an object or moving the object from the area A to the area B at a operation S43 in FIG. 11.

FIG. 13 is a flowchart illustrating a process for removing an object or moving the object from the area A to the area B at the operation S43 in FIG. 11.

In FIG. 13, the objects being in any one of the areas A and B are each focused on one by one, and a following process is carried out for the focused-on object (operation S431).

An identification is made whether a pointer pointing at the focused-on object exists (operation S432). If no pointer points at the object, remove the object from the memory (operation S433). The process returns to the operation S431 so as to focus on the next object, and carry out a similar process for the new focused-on object. The process for searching for an existing pointer and for removing an object with no pointer at the operations S432 and S433 is a basic process known as garbage collection (GC), and its detailed explanation is omitted.

If a pointer pointing at the focused-on object is identified as existing at the operation S432, '1' is added to the number of times of GC running (see FIG. 3) of the focused-on object (operation S434). An identification is made whether the object is in the area A or in the area B (operation S435). If the object is not in the area A (but in the area B), the process returns to the operation S431. If the object is in the area A, the process proceeds to operation S436 so as to identify whether the number of times of GC running of the object has exceeded a threshold (operation S436). The threshold is an example of the first threshold of the application. If the number of times of GC running of the object has not exceeded the threshold yet, the process returns to the operation S431. If the number of times of GC running of the object has exceeded the threshold, the process returns to the operation S431 after the object is moved to the area B (operation S437).

If the process is completed for all the objects being in the areas A and B, the routine is exited (operation S431).

Figure 14:
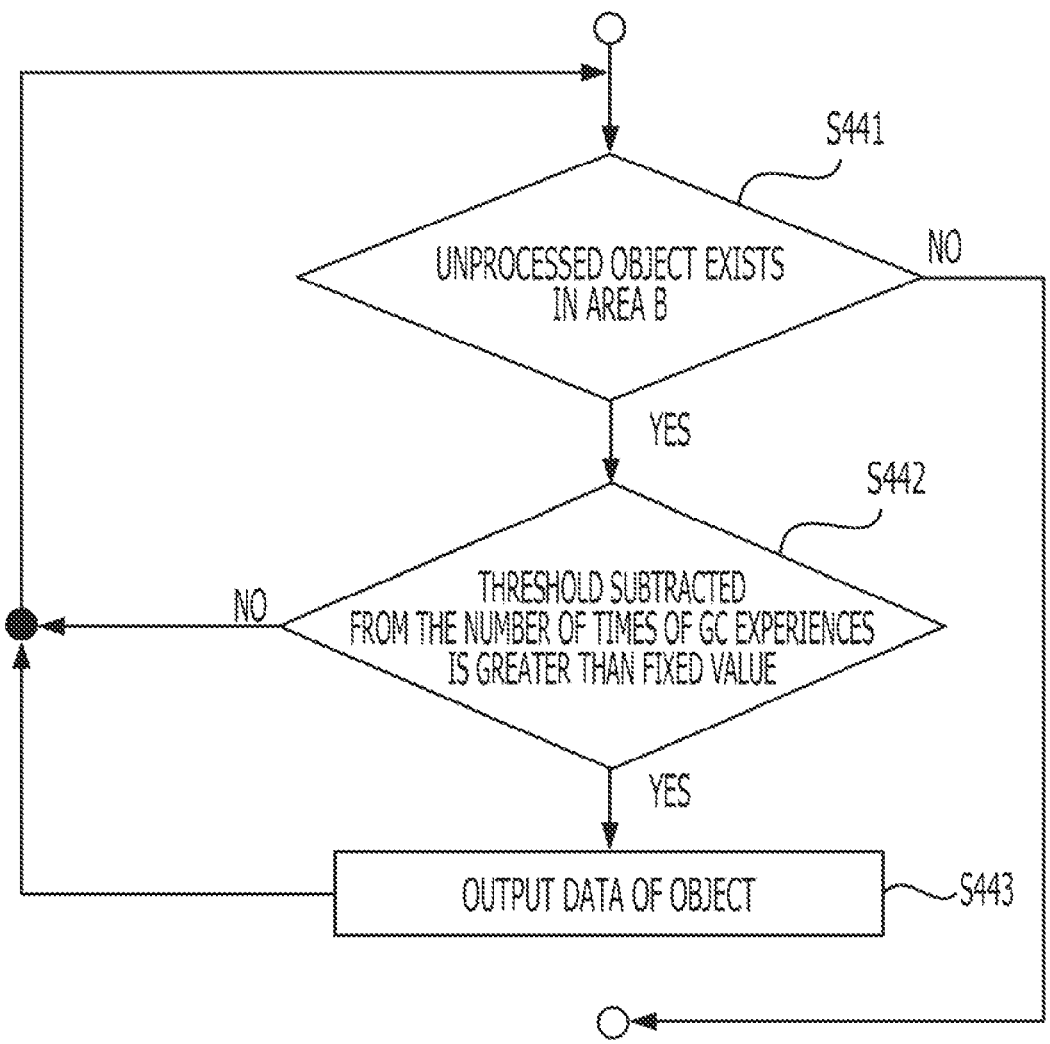
FIG. 14 is a flowchart illustrating a process for outputting data of an object possibly causing a memory leak at a operation S44 in FIG. 11.

FIG. 14 is a flowchart illustrating the process for outputting data of an object possibly causing a memory leak at the operation S44 in FIG. 11.

In FIG. 14, while the objects being in the area B are each focused on one by one, a following process is carried out for the focused-on object (operation S441).

A check of the number of times of GC running of the focused-on object being in the area B is made, and an identification is made whether the threshold (used at the operation S436 in FIG. 13) subtracted from the number of times of GC running is greater than a fixed value (operation S442). The sum of the "threshold" and the "fixed value" is an example of the second threshold of the application.

If the threshold subtracted from the number of times of GC running is smaller than the fixed value, the process returns to the operation S441 so as to carry out a similar process focusing on the next object being in the area B.

If the threshold subtracted from the number of times of GC running is greater than the fixed value, output the data of the object (operation S443). The process returns to the operation S441.

If the process is completed for all the objects being in the area B, the routine is exited.

FIG. 15 illustrates exemplary data of the object output at the operation S443 in FIG. 14 and possibly causing a memory leak.

As a form of data output, data illustrated in FIG. 15 is displayed here on a screen of the image display device which forms the output device 24 of the operation processing device 10 illustrated in FIG. 1.

The first line illustrated in FIG. 15 indicates an object that has never been accessed while experiencing the GC process 1000 times. The second and following lines indicate history of production of the object (see FIG. 4).

Modifications of the embodiment will be explained below. Matters different from the embodiment only will be explained for each of the modifications.

According to the embodiment described above, the data output process is carried out in course of the GC process (see FIGS. 11 and 14). The data output process can be carried out as explained below in addition to, or instead of, being carried out in course of the GC process.

Figure 16:
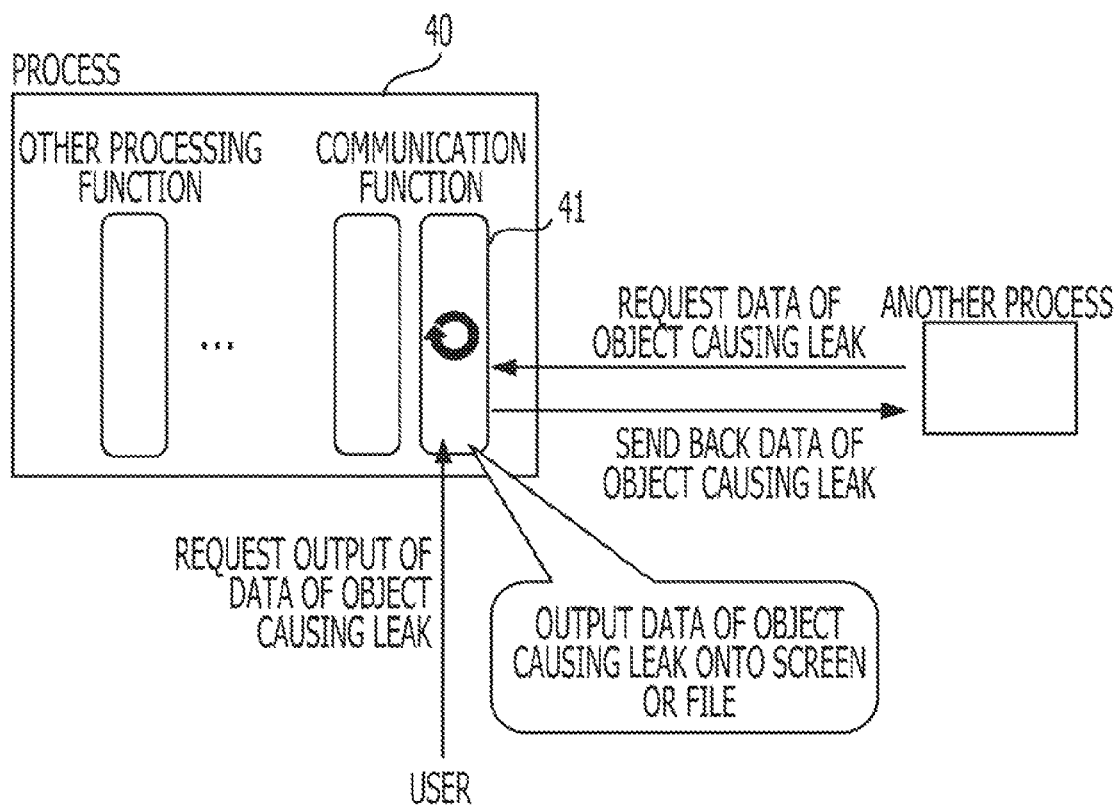
FIG. 16 illustrates a modification of a data output process of an object which highly possibly causes a memory leak.

FIG. 16 illustrates a modification of the data output process of an object highly possibly causing a memory leak.

FIG. 16 illustrates that the process 40 illustrated in FIG. 1, upon the communication function 41 in the process 40 being requested by another process to send data of an object causing a leak, sends the data of the object causing a leak back to the process which made the request. FIG. 16 illustrates that the process 40, upon being requested by a user of the operation processing device 10 through an operation on the input device 23 to output data of an object causing a leak, outputs the data of the object causing a leak onto the screen or a file.

As described above, the process 40 can be configured, upon being requested to send data of an object causing a leak, to carry out a process corresponding to FIG. 14 and to output the data.

If no data output process is carried out in the GC process, the process of the operation 44 in FIG. 11, e.g., the process illustrated in FIG. 14 is excluded from the GC process.

Figure 17:
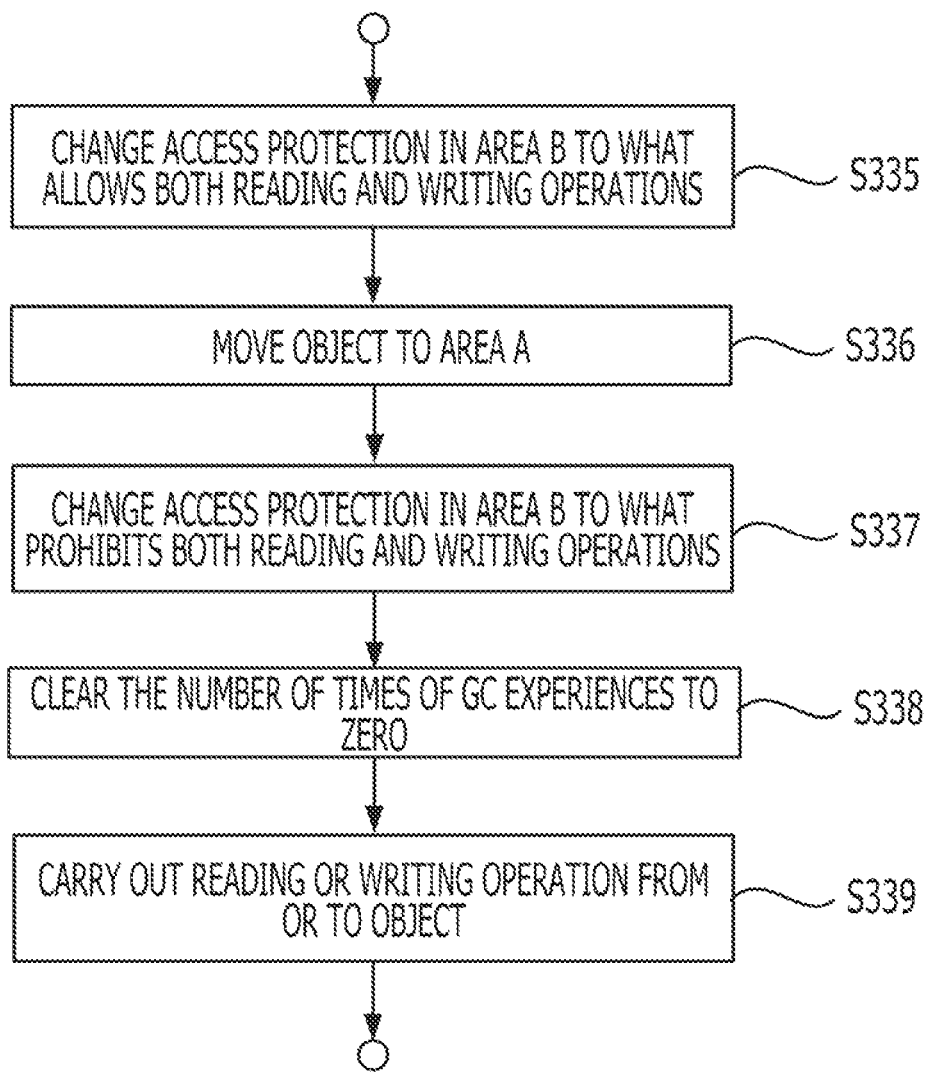
FIG. 17 is a flowchart illustrating a modification of a process for moving an object from the area B to the area A.

FIG. 17 is a flowchart illustrating a modification of a process for moving an object from the area B to the area A.

FIG. 17 illustrates a handling process to be employed instead of the handling process illustrated in FIG. 10 of the above embodiment.

If the handling process illustrated in FIG. 17 is employed for the operation S33 in FIG. 9, the handling process of FIG. 10 and the process of the operation S42 in the GC process illustrated in FIG. 11 may be omitted, e.g., the process illustrated in FIG. 12. Further, the list illustrated in FIG. 8 may also not be made.

According to the handling process illustrated in FIG. 17, the access protection in the area B is changed to what allows both reading and writing operations (operation S335). The object being in the area B accessed at the operation S31 in FIG. 12 is moved to the area A (operation S336), and the access protection in the area B is changed to what prohibits both reading and writing operations (operation S337). Further, the number of times of GC running of the object that has been moved to the area A is cleared to zero (operation S338), and a reading or writing operation from or to the object is carried out (operation S339).

Although being carried out by the GC running function 44 according to the embodiment described above, the process for moving the object from the area B to the area A can be carried out by the handling process running function 42 as illustrated in FIG. 17. If the moving process is carried out by the handling process running function 42, the process for making the list illustrated in FIG. 8, etc., is unnecessary, so that the process can be simplified. In this case, however, the moving process is carried out in the handling process in course of an application program being run, e.g., an exceptional process of a raised priority, resulting in an increase in the processing load for that. Meanwhile, the GC process can be carried out at a time when the operation processing device 10 can afford to run applications, so as to prevent the load from increasing.

For any of the embodiment and the modifications, however, it is enough to observe objects being only in the area B and a memory leak can be detected with a light load.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A method of detecting a memory leak of an operation processing device having a processor and a memory using the processor, the method comprising:
producing an object which occupies a first area of the memory;
running a garbage collection process to check an existence of a pointer which points at the object repeatedly, the garbage collection process includes deleting the object when the pointer does not exist and increasing a counter value when the pointer exists;
allowing access to a second area of the memory by setting an access protection for reading and writing operations and moving the object from the first area to the second area when a counter value which indicates a number of running times of the garbage collection process exceeds a first threshold;
detecting an illegal access to the second area based on the access protection and determining the object occupying the second area as impossibly causing the memory leak when the object occupying the second area is to be accessed;
allowing access to the second area based on the access protection, storing an address of the object to the memory, moving the object as impossibly causing the memory leak from the second area to the first area and clearing the counter value of the object when the object occupying the second area is to be accessed; and
determining the object occupying the second area as possibly causing the memory leak and outputting the object possibly causing the memory leak when the counter value exceeds a second threshold, the second threshold being a sum of the first threshold and a fixed value.

2. The method of detecting a memory leak according to claim 1, further comprising:
detecting an illegal access to the object on the second area by an operating system including a function for changing the access protection.

3. The method of detecting a memory leak according to claim 1, wherein the outputting of the object includes outputting the object when the counter value exceeds the second threshold and when receiving a request to output an object that is not being used.

4. An operation processing device comprising:
a processor configured to run a program; and
a memory coupled to the processor, the memory having a first area and a second area, wherein the processor is configured to execute a process that:
products an object on the first area;
runs a garbage collection process to check an existence of a pointer which points at the object repeatedly, the garbage collection process includes detecting the object when the pointer does not exist and increasing a counter value when the pointer exists;
allows access to a second area of the memory by setting an access protection for reading and writing operations and moves the object from the first area to the second area when a counter value which indicates a number of running times of the garbage collection process exceeds a first threshold;
detects an illegal access to the second area based on the access protection and determines the object occupying the second area as impossibly causing the memory leak when the object occupying the second area is to be accessed;
allows access to the second area based on the access protection, stores an address of the object to the memory, moves the object as impossibly causing the memory leak from the second area to the first area and clears the counter value of the object when the object occupying the second area is to be accessed; and
determines the object occupying the second area as possibly causing the memory leak and outputs the object possibly causing the memory leak when the counter value exceeds a second threshold, the second threshold being a sum of the first threshold and a fixed value.

5. A non-transitory computer-readable storage medium storing a program causing a processor to execute a process, the process comprising:
producing an object which occupies a first area of the memory;
running a garbage collection process to check an existence of a pointer which points at the object repeatedly, the garbage collection process includes detecting the object when the pointer does not exist and increasing a counter value when the pointer exists;
allowing access to a second area of the memory by setting an access protection for reading and writing operations and moving the object from the first area to the second area when a counter value which indicates a number of running times of the garbage collection process exceeds a first threshold;
detecting an illegal access to the second area based on the access protection and determining the object occupying the second area as impossibly causing the memory leak when the object occupying the second area is to be accessed;
allowing access to the second area based on the access protection, storing an address of the object to the memory, moving the object as impossibly causing the memory leak from the second area to the first area and clearing the counter value of the object when the object occupying the second area is to be accessed; and
determining the object occupying the second area as possibly causing the memory leak and outputting the object possibly causing the memory leak when the counter value exceeds a second threshold, the second threshold being a sum of the first threshold and a fixed value.

* * * * *